United States Patent [19]

Hume, III

[11] Patent Number: 4,702,496

[45] Date of Patent: Oct. 27, 1987

[54] BOOK BINDING PROCESS INVOLVING PRIMER ADHESIVE CONTAINING STARCH

[75] Inventor: Robert M. Hume, III, Cottage Grove, Minn.

[73] Assignee: H. B. Fuller Company, St. Paul, Minn.

[21] Appl. No.: 898,446

[22] Filed: Aug. 19, 1986

Related U.S. Application Data

[60] Continuation-in-part of Ser. No. 866,362, May 23, 1986, which is a division of Ser. No. 773,456, Sep. 9, 1985, Pat. No. 4,608,111, which is a division of Ser. No. 600,400, Apr. 16, 1984, Pat. No. 4,564,649.

[51] Int. Cl.$^4$ .................. B42C 9/00; B42C 11/00; B42D 1/00
[52] U.S. Cl. .................. 281/15 R; 412/8; 156/321
[58] Field of Search .................. 412/4, 5, 8; 156/908, 156/321, 322; 281/15 R

[56] References Cited

U.S. PATENT DOCUMENTS

| | | | |
|---|---|---|---|
| 3,844,868 | 10/1974 | Wentroble et al. | 156/321 X |
| 4,116,740 | 9/1978 | Musselman et al. | 156/156 |
| 4,297,154 | 10/1981 | Keller | 156/321 X |
| 4,377,649 | 3/1983 | Sweeney et al. | 524/49 |
| 4,442,129 | 4/1984 | Niwa et al. | 156/321 X |
| 4,564,649 | 1/1986 | Hume et al. | 524/13 |
| 4,608,111 | 8/1986 | Hume et al. | 156/306.6 |
| 4,668,325 | 5/1987 | Katz | 156/322 |

FOREIGN PATENT DOCUMENTS

| | | |
|---|---|---|
| 13-031 | 7/1980 | European Pat. Off. . |
| 53-014818 | 2/1978 | Japan . |
| 53-126308 | 10/1978 | Japan . |
| 54-064116 | 5/1979 | Japan . |
| 57-198771 | 12/1982 | Japan . |

OTHER PUBLICATIONS

"Why National Starch Dropped R&D in Hot Melt Corrugating", Paperboard Packaging (Nov. 1974) at pp. 54–55.

*Primary Examiner*—Paul A. Bell
*Attorney, Agent, or Firm*—Merchant, Gould, Smith, Edell, Welter & Schmidt

[57] ABSTRACT

The present invention relates to an improved bookbinding process comprising the use of an aqueous primer adhesive composition containing ungelatinized starch. A layer of the primer adhesive is coalesced to a resilient hinge by the application of a hot-covering adhesive without the need for an intermediate drying step. The coalesced film of primer adhesive provides a suitable underlying substrate for the adherent covering adhesive which binds the cover stock to the finished book.

17 Claims, No Drawings

BOOK BINDING PROCESS INVOLVING PRIMER ADHESIVE CONTAINING STARCH

CROSS-REFERENCE TO RELATED APPLICATIONS

This application is a continuation-in-part of application Ser. No. 866,362, filed May 23, 1986; which is a divisional of application Ser. No. 773,456, filed Sept. 9, 1985, U.S. Pat. No. 4,608,111 which is a divisional of application Ser. No. 600,400, filed Apr. 16, 1984, now U.S. Pat. No. 4,564,649.

FIELD OF THE INVENTION

The present invention relates to an improved bookbinding process comprising the use of an aqueous primer adhesive composition containing ungelatinized starch. A layer of the primer adhesive is coalesced to a resilient hinge by the application of a hot covering adhesive without the need for an intermediate drying step. The coalesced film of primer adhesive provides a suitable underlying substrate for the adherent covering adhesive which binds the cover stock to the finished book.

BACKGROUND OF THE INVENTION

The automation of book binding has allowed book production to proceed as an essentially continuous process from the printing and compilation of the pages, or signatures, into book blocks, through the gluing of the block spines, to the application of the cover stock and trimming. Typically, individual pages or signature folds are collated into a compressed stack, or "block". The block may be sewn prior to further processing. Prior to application of the primer adhesive, the outer surface of the spine area can be cut and roughened by a rotating blade to yield an absorptive, planar surface. The block is next provided with a flexible hinge by the application of a coating of a primer adhesive, which may be a latex comprising an emulsified polymeric adhesive resin, or an aqueous animal glue adhesive. The primer is applied in one or more applications by brushing, rolling or a similar process so as to coat and penetrate the roughened spine. A portion of the wet primer wicks between the sheets to form a matrix which when dry, binds the sheets into the body of the flexible film which forms a part of the spine of the block.

The coating of wet primer is next dried and set by exposure of the coating to an intense, high temperature heat source. At least one coating of a covering adhesive, which may be a natural or synthetic animal glue or a polymeric hot-melt type adhesive, is then applied over the dried primer layer to provide the backbone. The cover is adhered to the backbone and the bound pages are trimmed.

The maximum speed at which the adhesive application steps can be accomplished has been limited by the time needed to dry and set the water-based primer layer prior to application of the covering adhesive layer. However, the use of elevated temperatures to speed the drying of the wet primer coatings is limited by a number of factors. Primers based on animal proteins resist moisture release at low temperatures but are subject to extensive thermal degradation at high application or drying temperatures. When dried, these primer layers can exhibit defficiencies with respect to film strength, flexibility and absolute adhesion to the paper.

Latex-based primers skin over when exposed to intense heat sources; the wet coating becomes surfaced with a thin polymeric membrane. The water entrained in the interior of the primer layer vaporizes and lifts this dried membrane into large blisters which can break and burn as they approach the heat source. If the subsequently-applied covering adhesive fails to adhere fully to these blistered or burned layers of primer, the binding process cannot be completed satisfactorily. The damaged, partially-bound books often jam in the assembly line and must be removed and discarded, resulting in substantial economic losses. Furthermore, if the primer coating is not sufficiently dried, application of a hot-melt adhesive at conventional temperatures of about 150°-200° C. can cause splattering and blistering of aqueous primer adhesives.

Recently, improved latex-based aqueous primer adhesives which resist blistering and charring when exposed to high drying temperatures, have been developed which address this problem. See U.S. Pat. No. 4,536,012. These adhesives contain an amount of ungelatinized starch granules effective to complex a major portion of the water in said primer compositions during the drying process. As the temperature of the wet primer coating rises, the starch swells by absorbing contiguous water. At the same time, the primer adhesive coating is coalesced into a uniform plastic film. As the temperature continues to increase, the bound water is released uniformly and relatively slowly from the swollen starch granules. This controlled water release allows the resultant film to resist the formation of large blisters and their subsequent charring. A multiplicity of much smaller bubbles form and burst, cratering the surface of the primer film. The primer coating dries into a uniform, resilient layer which possesses a surface which is well-suited for the application of further adhesive coatings.

In spite of this advance, however, it will be appreciated that the speed of the book binding process would be improved if the need for an intermediate drying step between the application of the primer adhesive and the covering adhesive could be entirely eliminated. Such a simplification would substantially reduce the production time required for each book. It would also allow manufacturers to reduce the energy input required by eliminating the need for thermal energy during the drying step, thereby lowering production costs.

It will be further appreciated that additional advantages can be achieved by reducing the high temperatures required in the application of conventional covering adhesives. For example, in the process disclosed in U.S. Pat. No. 4,536,012, the hot-melt is applied to the dried primer layer at about 150°-200° C. If the covering adhesive could be handled and applied at substantially lower temperatures, the burn hazard to workers would be diminished. In addition, less time would be required to cool the covering adhesive prior to the cover pick up step.

BRIEF DESCRIPTION OF THE INVENTION

The present invention is directed to an improved book-binding process comprising the use of a latex-based primer adhesive composition containing ungelatinzed starch. A layer of the wet primer is applied to the spine area of the book block and is coalesced to a resilient hinge by the application of a hot covering adhesive without the need for an intermediate drying step. The coalesced film of primer adhesive provides a suitable underlying substrate for the adherent covering adhesive which binds the cover stock to the book block. In addition, a covering adhesive such as a natural or synthetic animal glue, may be employed which can be applied to the wet primer adhesive coating at temperatures substantially below about 150° C.

The method of the present invention is particularly well-adapted to the assembly of books which have conventionally employed primers based on animal glues to hinge blocks formed of uncoated, highly moisture absorbent papers. Such books include mass-market paperbacks, catalogs, telephone directories, and the like. Unlike aqueous primers based on animal glues such as bone glue, the present starch-latex primers adhere well to coated paper stocks, thus permitting the inclusion of coated, or glossy inserts into such books without weakening the page strength of the finished assembly. The present primers are also highly effective with respect to their adherence to blocks which are formed of coated stock.

The preferred primer composition for use in the present method comprises an adhesive latex and an amount of ungelatinized granular starch effective to complex the latex water upon application of the hot covering adhesive so that no intermediate drying step is required prior to application of the covering adhesive. Instead of complexing and then evaporating the residual water from the coating of primer adhesive in a discrete drying step, the covering adhesive is applied directly onto the wet primer layer at a temperature which is sufficient to coalesce the primer adhesive to a resilient, flexible film. The covering adhesive can be applied at about 35°–100° C., preferably at about 50°–80° C.

The absence of an intermediate drying step which drives off essentially all of the primer water, does not preclude the external application of heat following primer application to the extent necessary to gel a portion of the starch in the liquid primer layer. It is to be understood, however, that when the covering adhesive is applied, the primer has not been completely coalesced or dried. It is believed that the melding of the liquid or quasi-liquid primer layer with the liquid layer of the covering adhesive contributes substantially to the greatly increased total strength of the finished books.

The elimination of the need for an intermediate drying step between the application of the primer adhesive and the application of the covering adhesive permits a substantial increase in the speed at which the adhesive application steps can be accomplished, and consequently increases the speed of the entire continuous book binding process. In eliminating the drying step, the use of thermal energy is also reduced, thereby lowering the overall manufacturing costs.

The use of covering adhesives which can be applied at temperatures below about 150° C. reduces the time required to cool the covering adhesive prior to cover pick up. Furthermore, the exposure of the hot covering adhesive to a relatively cool, unheated layer of primer decreases the time necessary for the covering adhesive to cool and become tacky. In addition, the application of adhesives at lower temperatures improves plant safety, because workers are not exposed to the danger of burns caused by high-temperature liquid adhesives.

A preferred covering adhesive is an aqueous animal glue-based adhesive which comprises a hide glue in admixture with a humectant-plasticizer. Another covering adhesive for use in the invention is a synthetic animal glue adhesive comprising about 25–75% by weight of an aqueous phase and about 25–75% of a solid component which contains a lignin sulfonate composition and a polyvinyl alcohol composition. Preferably, there are about 1 to 8 parts of the lignin sulfonate composition per each part of the polyvinyl alcohol composition. The liquid covering adhesive can be applied hot by conventional means to form a coating of about 0.1 to 100 mils in thickness. Following cooling of the adhesive layer to a tacky film or gel, it is brought into contact with the book cover. The assembly is clamped, and trimmed to complete the book binding process.

While we do not wish to be bound by any theory of action, it is believed that sufficient heat is transferred from the covering adhesive to the primer adhesive to cause the ungelled starch to swell and adsorb the residual latex water. This causes the primer adhesive to coalesce to form a uniform flexible film on the spine of the book block which acts to firmly bind the pages thereto. Thus, the latex water bound by the gelled starch is not available to disrupt the integrity of either the primer or the covering adhesive layers.

DETAILED DESCRIPTION OF THE INVENTION

Primer Compositions

Latexes

The present primer compositions are modified adhesive latexes. The major portion of the latex solids are emulsified particles of adhesive polymeric resins. Any suitable water-dispersible polymeric resin may be employed as the polymeric solid phase, including, but not limited to polychloroprene (neoprene), styrene-butadiene rubber, vinylvinylidene chloride, ethylene-vinyl chloride copolymers, ethylene-vinyl acetate copolymers, vinyl acetate-acrylic acid copolymers and acrylonitrite-butadiene copolymers. Preferred polymeric latex adhesive bases include the alkali-soluble vinyl acetate-acrylic acid copolymer available as a 55% aqueous emulsion as Covinax ™ 106 from the Franklin Chemical Co., Columbus, OH and Dow ™ 620 styrene-butadiene latex (Dow Chemical Co.). Especially preferred latex adhesives include the ethylene vinyl acetate copolymers available as 47–55% aqueous dispersions as the Airflex ™ series (Air Products Corp., Allentown, PA), or the ethylene-vinyl acetate copolymer available as Elvace ™ 1875 (54.5% solids) from Riechhold Chemical, Dover, Del.

Primer compositions are commonly prepared by dosing such latexes with minor but effective amounts of surfactants, biocides, foam-control agents and plasticizer, and by adding water, if necessary, to bring the solids content into the desired range.

Starch

The highly-desirable properties exhibited by the present primer composition are achieved by the incorporation therein of an amount of ungelatinized (nonswollen) starch granules effective to complex or absorb the water in a layer of the primer composition when the hot covering adhesive layer is applied thereto. It is believed that this complexation causes the adhesive particles dispersed in the primer coating to coalesce, forming a uniform, resilient film which firmly binds the individual sheets of the book block thereto.

Starch is a high molecular weight carbohydrate of the general formula $(C_6H_{10}O_5)_n$. Starch granules exhibit a structure of concentric sheets which contain an elutable amylose fraction in the inner layers and an amylopectin fraction in the outer layers. When starch granules are contacted with water and heated above a temperature designated as the gel point, the granules begin to bind water and swell. The gel temperature for a particular starch variety depends on a number of factors, including particle size, pH and absolute concentration. If the weight ratio of starch to water is high enough, the effect of exceeding the gel temperature will be to gel substantially all of the water into a thick paste.

Starches useful in the present primer compositions will be chosen from any of those which can be mixed with the base primer composition at a concentration effective to complex a major portion of the free water present, while not overly increasing the viscosity of the primer compositions prior to the application of the covering adhesive.

Useful starches may be selected from any of a wide variety of commercially-available products including but not limited to barley, corn, potato, wheat, rice, waxy maize, sago, sorghum, arrowroot, tapioca or mixtures thereof. These raw starches typically have granules sized within the range of about 2-150 microns, as measured along the longest axis, and exhibit gel temperatures of about 55°-80° C. Since these starches can bind about 600-1000% of their weight of water, for most binding applications useful amounts of the starch additive will fall within the range of about 1-20%, preferably about 2-15% and most preferably about 3-10% of the total wet weight of the primer composition. Although it is preferred to add an amount of starch within these ranges which will complex a major portion of the water in the composition, amounts of starch effective to absorb 50% or less of the composition water have been found to be effective in the present method, particularly when the primer adhesive is applied to a block formed of highly water-absorbent paper.

Surfactants

Although the commercially-available latexes useful as starting materials for primers often comprise minor amounts of dispersing agents for the polymeric adhesive particles therein, it is often desirable to add additional amounts of surfactants to enhance the ability of the polymeric dispersion to wet the paper fibers and help to maintain the starch additive in suspension. The added surfactants can be anionic, cationic, nonionic or amphoteric and should be selected to be compatible with the surfactants already present in the latex, if any.

Examples of useful nonionic surfactants include polyethylenoxy esters and ethers of alkylphenols, alkanols and mercaptans, as well as polyethylenoxy compounds with amide links. One useful class of nonionic surfactants is the Tergitol TM series, available from Union Carbide, which are formed by condensing about 3-10 moles of ethylene oxide with a $C_{12}$-$C_{15}$ alkanol. Another useful class of nonionic surfactants is the Glycoperse TM series, available from Glyco, Inc., Greenwich, CT, which are formed by condensing sorbitol and sorbitol anhydride mono- or tri-fatty acid esters which with about 4-25 moles of ethylene oxide. For example, Glycoperse TM 0-20 is polysorbate 80.

Examples of anionic surfactants include (a) carboxylic acids such as soaps of straight-chain naturally-occurring fatty acids, chain-substituted derivatives of fatty acids, branched-chain and odd-carbon fatty acids, acids derived from paraffin oxidation, and carboxylic acids with intermediate linkages; and (b) sulfuric esters such as sodium lauryl sulfate, tallow alcohol sulfates and coconut alcohol sulfates.

Examples of cationic surfactants include nonquaternary nitrogen bases such as amines without intermediate linkages, and quaternary nitrogen bases. The quaternary nitrogen bases are preferably those which also function as biocides, since such "quats" act to inhibit the growth of microorganisms which would attack the bindings of the finished books. Especially preferred quaternary ammonium surfactants are the $C_8$-$C_{20}$- alkyl(dimethyl)-(benzyl or substituted-benzyl) ammonium halides such as benzalkonium chloride, cetalkonium chloride, methylbenzethonium chloride, cetyl(dimethyl)ethyl ammonium bromide, domiphen bromide, gentian violet, dicoco(dimethyl)ammonium chloride, cetyl(trimethyl)ammonium bromine and the like.

Biocides

Apart from the antimicrobial action imparted to the latex primer adhesive by any added surfactants, it is often desirable to add an effective amount of one or more additional biocides, particularly in cases where a quat surfactant cannot be employed. Such agents include chlorhexidine gluconate, glutaral, hexachlorophene, nitrofurazone, nitromersol, thimerosol, $C_1$-$C_5$-parabens, chlorophene, phenolics, mefanide acetate, aminacrine hydrochloride, oxychlorosene, metabromsalene, merbromine and dibromsalan. Preferred biocides include sodium bisulfite, formaldehyde (formalin), cresols, sodium ortho-phenyl phenol (Dowicide TM A, Dow Chemical Co.), 2,2'-methylene-bis-(4-chlorophenol), which is available as Cuniphen TM 2778 from Ventron Corporation, Beverly, MA and 1,2-dibromo-2,4-dicyanobutene (Tektamer TM 38 A.D., Merck Chemical Div., Rahway, NJ).

Plasticizer

The present primer compositions preferably will include an amount of plasticizer effective to maintain the polymer particles in a flexible state, thus maintaining the resiliency of the dried, set primer adhesive. Useful plasticizers may be selected from any of the commercially-available benzoates, hydroxylated benzoates or hydroxylated benzyl esters of alkanols. One useful plasticizer is the mixed dibenzoate of dipropylene glycol and diethylene glycol, available from Velsicol Corp., Chicago, IL as Benzoflex TM 50. Another useful plasticizer is butyl benzyl phthalate available from Monsanto Co. as Santicizer TM 160.

Foam Control Agents

In addition to the plasticizer and biocide, the primer compositions preferably contain one or more foam control agents in an amount effective to substantially prevent the primer adhesive from foaming when it is applied to the roughened spine area, e.g., by rotating brushes. Any agent useful to control the surfactant-induced foaming of aqueous emulsions may be employed in the present primers, including but not limited to polysiloxanes such as simethicone, dimethicone copolyol, cyclomethicones and the like. Other useful foam-control agents are the proprietary Foamaster TM VF defoamers available from Diamond Shamrock Corp., Morristown, NJ, and the Nopco TM defoamers available from Nopco Chemical Division, Newark, NJ and Colloid TM 675, 711 and 796 available from Colloids, Inc., Newark, NJ.

pH Adjustment

The present primer compositions may also include a minor amount of a basic metal salt, e.g., sodium or potassium hydroxide, effective to lower the gel temperature of the starch employed. Amine bases such as urea, hydroxyethanol amines or ammonium hydroxide may also be employed. The use of such bases is indicated when a starch which swells at relatively high temperatures, e.g., rice or barely starch, is employed in primer compositions which are exposed to relatively low temperature covering adhesives. From about 0–5% of the base can preferably be employed in the present compositions. For example, the use of ammonia to increase the pH of a barely starch primer from about 3.5–4.5 to about 7.0–7.5, decreases the gel point of the starch from about 65°–70° C. (150°–160° F.) to about 57°–62° C. (135°–145° F.). The subsequent addition of urea can further lower the gel point of the primer to as low as about 46°–51° C. (115°–125° F.) without further decrease in the pH.

Thus, the primer compositions of the present invention will comprise about 50–97%, preferably about 75–95% of an adhesive latex; about 3–10% starch; about 0.05–5%, preferably about 0.1–1% of a biocide; about 0.05–2%, preferably about 0.07–1% of foam control agent; and about 1–10%, preferably about 2–7% plasticizer. Optionally, the primers can comprise about 0.02–5%, preferably about 0.05–2.5% of added surfactant and about 0.1–1% of an alkali metal hydroxide salt or an amine base. The starch-containing primers will comprise about 30–80% total solids, preferably about 45–65% total solids and most preferably about 55–63% total solids. Primer adhesives of this type and their use in conventional book-binding processes are disclosed in U.S. Pat. No. 4,536,012, the disclosure of which is incorporated by reference herein.

Preparation

The present adhesive primer compositions can be prepared by dispersing the starch and other adjuvants in the latex component in any convenient manner. Typically, an appropriate liquid mixer is charged with the latex, followed by addition of the plasticizer with stirring. After the polymeric granules have been adequately plasticized, e.g., after about 0.25–0.75 hours of stirring at 20°–30° C., defoamer is added, followed by the surfactants, if any, and the biocide. Slow stirring is continued until the mixture is homogenous and then the powdered starch is gradually added. After about 0.25–0.75 hours of slow mixing, water is added, if necessary, to adjust the viscosity and bring the total percent solids into the desired range. After screening the slurry to remove any agglomerated material, the composition is ready for use.

Primer Application

The finished starch-containing primer adhesives are applied to the spine area of the book block to a thickness of about 2–35 mils (50–875 microns), preferably about 25–30 mils (125–750 microns), by methods which are well-known to the art; for example, by moving the block over a rotating brush or wheel.

Covering Adhesive

The primer layer is next coated with a layer of a covering adhesive, such as a natural or synthetic animal glue-based adhesive, or a hot-melt adhesive, which functions to adhere the cover stock to the backbone of the book. Typically, the covering adhesive will be applied to the primer adhesive as a liquid heated to a temperature which is effective to coalesce the primer adhesive, e.g., to about 35°–100° C., most preferably about 50°–80° C. After application, it may be necessary to cool or dry the liquid covering adhesive until it attains the required degree of tackiness. The coverstock is then applied to the individual book blocks and the books are trimmed. In a continuous binding operation, the covering adhesive is generally applied to the individual book blocks by passing them over a heated reservoir of the adhesive which is fed onto a rotating wheel and doctored to the necessary thickness. It may also be sprayed on or applied in any other conventional manner.

Hot-Melt Adhesives

Hot-melt adhesives employed in book binding typically comprise combinations of a polymeric component with a tackifying wax or resin and, optionally, an oil and a minor amount of resinous or monomeric plasticizer.

Substances useful as the polymeric component of hot-melt adhesives include ethylene-vinyl acetate copolymers, block copolymers of styrene with isoprene, butadiene or ethylenebutylene midblocks, polyamides, polyisobutylene, polyacrylates or polyesters. Of these polymers, ethylene-vinyl acetate copolymers are preferred, due to their compatibility with the preferred ethylene-vinyl acetate latexes used to form the primers. The tackifiers commonly used in hot-melt adhesive formulations includes rosins, rosin-resin esters, polyterpenes, terpene phenolics, aliphatic and aromatic hydrocarbons, asphalt and the like. Hot-melt adhesives of this type are commercially available as the HM series from H. B. Fuller Co., St. Paul, MN, i.e., HM-1922, HM-1330, HM-1832 and HM-3415.

Animal Glue-Based Adhesive

Animal Glue

Animal glues useful in this invention are the hydrolysis products of the protein collagen which is extracted from animal tissues such as skin, hide, bone, sinew, and tendon. These glues are available as granular powders or flakes which include 80–90% glue protein, and which exhibit a jelly value of greater than about 299 bloom grams. Their general utility depends on the nature of the hydrolytic breakdown that takes place during manufacture. Preferred animal glues include the hide and bone glues available from Hudson Industries, Corp., Johnson, NY.

Humectant Plasticizer

The animal glue adhesives and the lignin sulfonatepolyvinyl alcohol adhesives of this invention can contain a material that plasticizes the mixture. Plasticizers are defined as materials incorporated into a composition that can increase its workability and flexibility or distensability. Plasticizers that can be used in the covering adhesives of this invention include the humectant plasticizers that can complex a sufficient plasticizing amount of water, thus insuring the flexibility and toughness of the adhesive film. The most preferred group of plasticizers include polyhydroxy compounds having 2 or more hydroxyl groups and 2 or more carbon atoms. Typical examples of such plasticizers include ethylene glycol, diethylene glycol, triethylene glycol, propylene glycol, 1,2-butylene glycol, 1,4-butylene glycol, sorbitol, glycerin, glucose, sucrose, invert sugar, glycerol monomethyl ether, poloxyalkylene glycols and mixtures thereof.

Therefore, animal glue-based adhesives preferred for use in the present invention will comprise about 25–50%, most preferably about 30–45% by weight of animal glue; about 20–40%, most preferably about 25–35% of a humectant plasticizer and about 15–40%, most preferably about 20–35% water. Optional ingredients for modification of the properties of these glues include about 0.5–2% foam control agent, about 0.1-1% biocide and minor but effective amounts of pigment, surfactant, fragrance and/or binder. The surfactant, foam control agent and biocide may be selected from those disclosed to be useful in the primer compositions described hereinabove.

Preparation

The animal glue-based adhesives can be prepared by mixing the water, animal glue, the glycol or glycerin plasticizer and any biocide or defoamer at about 20°-45° C. for about 5-15 min., followed by heating the stirred mixture to about 70°-75° C. (160°-165° F.). The sugar humectant plasticizer, if any, is then added, followed by adjuvants such as fragrance, binder, and additional defoamer and water, as needed.

Synthetic Animal Glues

Covering adhesives which may be considered synthetic animal glues include aqueous adhesives which contain about 25-75% by weight of an aqueous phase and about 25-75% of solid component dispersed therein consisting essentially of a lignin sulfonate composition and a polyvinyl alcohol composition. Preferably, there are about 1 to 8 parts of the lingin sulfonate composition per each part of the polyvinyl alcohol composition. These adhesives exhibit substantially improved heat and biological stability, extended pot life, easy clean up, low odor, elevated tack, extended open time, and have a substantially lower cost than glues based upon natural animal protein. After manufacture the synthetic adhesives can be dimensionally stable, biologically stable and flexible. Adhesives of this type are fully disclosed with respect to their formulation and use in conventional book-binding processes in U.S. Pat. No. 4,564,649, the disclosure of which is incorporated by reference herein.

Lignin Sulfonate

Lignin is a major constituent of wood and woody plants comprising about one-quarter of the dry weight of such materials. It appears to function as a natural plastic binder for the cellulosic fibers which make up the structural units of the plant. During the pulping process, lignin is made water-soluble by reaction with sulfite resulting in sulfonation. The products derived from the solubilized sulfonated lignin are referred to as lignin sulfonates. The structure of these lignin sulfonates cannot be completely determined; however, they appear to be a mixture of polymers containing units of aromatic rings, methoxy groups, aromatic and aliphatic hydroxyl groups and ketone and aldehyde carboxyl groups. It appears that the basic monomeric unit of lignin is a sulfonated substituted guaiacyl propane.

Lignin sulfonates commonly contain many sulfonated compounds with a broad range of molecular weights and degrees of sulfonation. They can contain small amounts of natural sugars such as mannose, glucose, xylose, and galactose, and can contain small amounts of higher molecular weight polysaccharides. Lignin sulfonates are commonly available, from a number of commercial sources, as light brown dried powders or as viscous aqueous solutions.

Polyvinyl Alcohol

Polyvinyl alcohol (PVA), a polyhydroxy polymer having a polymethylene backbone with pendent hydroxy groups, is a water-soluble synthetic resin. It is produced by the hydrolysis of polyvinyl acetate. The theoretical monomer ($CH_2=CHOH$) does not exist. Polyvinyl alcohol is one of the few high molecular weight commercially-available polymers that is water-soluble. Polyvinyl alcohol is made by first forming polyvinyl acetate and removing the acetate groups using a base catalyzed alkanolysis. The production of polyvinyl acetate can be done by conventional processes which controls the ultimate molecular weight. Catalyst selection temperatures, solvent selection and chain transfer agents can be used by persons skilled in the art to control molecular weight. The degree of hydrolysis is controlled by preventing the completion of the alkanolysis reaction. It is commonly available as a dry solid and is available in granular or powdered form. PVA grades include both the fully hydrolyzed form (99%+ removal of the acetate group), a form of intermediate hydrolysis (about 98 to 91% removal of acetate group), and a partly hydrolyzed (about 90 to 85% removal of the acetate group) polyvinyl alcohol.

The properties of these resins vary according to the molecular weight of the parent polymer and the degree of hydrolysis. Polyvinyl alcohols are commonly produced in nominal number average molecular weights that range from about 20,000 to about 100,000. Commonly, the molecular weight of commercial polyvinyl alcohol grades is reflected in the viscosity of a 4wt-% solution measured in centipoise (cP) at 20° C. with a Brookfield viscometer. The viscosity of a 4% solution can range from about 5 to about 65 cP. Variation in flexibility, water sensitivity, ease of solvation, viscosity, block resistance, adhesive strength and dispersing power can all be varied by adjusting molecular weight or degree of hydrolysis. Solutions of polyvinyl alcohol in water can be made with large quantities of optional lower alcoholic cosolvents and salt cosolutes. Polyvinyl alcohol is made in the United States by Air Products Chemicals, Inc. under the trade name Vinol TM, by duPont under the trade name Elvanol TM, and by Monsanto under the trade name Gelvitol TM.

Fibers

In some cases, the bond strength and the adhesion of the lignin sulfonate-PVA composition can be improved by the addition of an effective amount of fiber. Both synthetic and natural fibers can be used. Useful synthetic fibers can be made from metal, glass, graphite, nylon, polyester, polyolefin, boron, and the like. Examples of natural fibers include wool, flax, bamboo, etc. A preferred fiber for reasons of ease of use and utility is a cellulosic fiber. Cellulose can be derived from another number of sources. However, cellulose derived from hard or soft wood or cotton tends to have exceptional purity and performance characteristics in the context of the present adhesives. The preferred form of the cellulosic fiber used in the adhesives of this invention comprise elongated fibers, fiber units or fiber bundles having dimensions of from about 1 to about 100 millimeters in length and a diameter of about 0.5 to 450 microns. Since the cellulose is a polymer of repeating carbohydrate units having pendent hydroxyl groups, the hydroxyl groups can interact, by hydrogen bonds, with the polyvinyl alcohol compositions in the invention to increase the film strength of the adhesive.

The lignin sulfonate-polyvinyl alcohol adhesives of this invention can also contain a variety of well-known adhesive constituents including thermoplastic and thermosetting resins, natural and synthetic rubbers, boric acid and salts thereof, preservatives, anti-foam agents, sequestering agents, surfactants, perfumes, dyes, pigments, and the like.

The lignin sulfonate-polyvinyl alcohol adhesive compositions useful in the present invention are made in an aqueous base. Typically, the adhesive can contain 75 to 25 wt-% of solids and about 25 to 75 wt-% water. The solids generally comprise a polyvinyl alcohol composition and a lignin sulfonate composition wherein there are about 1 to 8 parts by weight, preferably 1 to 5 parts by weight, of the lignin sulfonate per each part of the polyvinyl alcohol. If substantially greater than 8 parts by weight of the lignin sulfonate per each part of the polyvinyl alcohol is used, the tack of the adhesive is not sufficiently strong to result in successful adhesion in many applications. Most preferably, the adhesive comprises about 30 to 55 wt-% solids, and contains about 2 to 5 parts of the lignin sulfonate per each part of the polyvinyl alcohol for reasons of ease of preparation and enhanced adhesive properties. Further, the adhesives are often unable to maintain sufficiently long open time to be useful in all adhesive applications. In high solids adhesives, at proportions of greater than about equal parts of polyvinyl alcohol and lignin sulfonate, the adhesive tends to increase in viscosity such that it is difficult to handle and apply.

The lignin sulfonate-polyvinyl alcohol adhesive compositions of the invention can have a viscosity that falls in a broad range including from about 2,500 to about 100,000 cP, depending on the percent solids and the ratio of lignin sulfonate to polyvinyl alcohol.

The lignin sulfonate-polyvinyl alcohol adhesives of the invention can contain an effective amount of the humectantplasticizer such as a polyhydroxy plasticizer compound at a concentration of about 2–10% by weight. Most preferably, the adhesive contains an ethylene glycol, glycerin, or polyalkylene oxide plasticizer at a concentration of about 3–20% by weight.

The lignin sulfonate-polyvinyl alcohol adhesive compositions of the invention can contain the cellulosic fibers at a concentration of about 0.01-25% by weight based on the fully-compounded formulation. The preferred adhesives contain about 0.5-5% by weight of celluosic fibers, and most preferably, for reasons of strength and flexibility, the adhesives contain about 1-5% of a cellulose fiber derived from wood.

The invention will be further described by reference to the following detailed examples.

EXAMPLE I

Primer Composition

A vertical kettle mixer was charged with 360 g of a 15% ethylene-85% vinyl acetate copolymer latex, 55% solids, (Airflex TM 400 latex) and 32 g of cornstarch was slowly added at 25° C. with stirring, followed by 2.0 g of 37% formaldehyde, 0.8 g of Nopco TM VF defoamer, 0.80 g Dowicide TM A biocide and 4.4 g water, to yield 400 g of an opague white primer adhesive having a viscosity of 2800 cP (Brookfield viscosimeter, spindle 3, speed 20 at 36° C.) a pH of 5.0 and containing 57.2% solids.

EXAMPLE II

Primer Composition

A vertical kettle mixer was charged with 415 g of Airflex TM 400 latex and 15 g of butyl benzyl phthalate (Santicizer TM 160) added with stirring. After 30 minutes of stirring at 25° C., 0.5 g of Nopco TM VF defoamer was added, followed by gradual addition of 40 g of corn starch, 0.75 g of 37% formaldehyde, 0.75 g of Dowicide TM A biocide and 28.0 g water. The opague primer composition exhibited a viscosity of 800 cp (spindle 2, speed 20 at 36° C.), a pH of 5.0 and contained 56.5% solids.

EXAMPLE III

Primer Composition

A vertical kettle mixer was charged with 353 g of a vinyl acetate-acrylic acid copolymer latex, 55% solids, (Covinax TM 106 latex) and 17.6 g of the mixed dibenzoate of propylene and ethylene glycol (Benzoflex TM 50) was added to the stirred latex. After 30 minutes of stirring at 25° C., 5.6 g of 37% formaldehyde was added, followed by 16 g of Nopco TM VF defoamer, 16 g of Colloid TM 711 defoamer, and 8 g of a phenolic biocide (Cuniphen TM 2778-I). After 10 minutes of slow mixing, 27.2 g of corn starch (Clinton Corn Products 121-B) was added and mixing continued another 0.5 hour. The resultant primer was screened (100 mesh) and exhibited a pH of 4.5 and a total solids content of 60%.

EXAMPLE IV

Primer Compositions

Exs. I and II are repeated substituting an ethylenevinyl acetate copolymer latex, 52.3% solids, (Elvace TM 1875 latex) for the Airflex TM 400 to yield primers IVA and IVB, respectively.

EXAMPLE V

Primer Composition

A vertical kettle mixer was charged with 420 g of a vinyl acetate-ethylene copolymer latex (Airflex TM 416 DEV latex), and 64.0 g of barley starch was slowly added at 25° C. with stirring. After 20 minutes, 20.0 g of Foamaster TM VF defoamer was added, followed by 480 g of Airflex TM 410 latex and 3.0 g of Tektamer TM 38 A.D. biocide. After 10 minutes of mixing, 1.0 g of additional defoamer was added, followed by an additional 30 g of a 1:3.5 mixture of ethanol:water.

EXAMPLE VI

Primer Composition

A vertical kettle mixer was charged with 900 g of Elvace TM 1875 latex. To the stirred latex was added 80 g of Clinton 121-B corn starch, 5.0 g of Tektamer TM 38 A.D. biocide and 2.0 g of Colloid TM 675 defoamer. To the stirred mixture was added a solution of 2.0 g of Dowicide TM A biocide and 4.0 g water, followed by 7.0 g of additional water. The finished primer exhibited a pH of 4.5 and contained 57% solids.

EXAMPLE VII

Primer Composition

A vertical kettle mixer was charged with 890 g of Airflex TM 401 latex. To the stirred latex was added sequentially, 3.0 g of Nopco TM VF defoamer, 32 g of barley starch, 3.0 g of Tektamer TM 38 A.D. biocide, 30 g of 1:3.5 mixture of ethanol:water, 30 g of 1,1,1-trichlorethane and 12 ml of water.

EXAMPLE VIII

Animal Glue-Based Covering Adhesive

A vertical kettle mixer equipped with steam-jacket heating was charged with 260 ml of water. Stirring was begun and 3.0 g Dowicide ™ A biocide, 149 g glycerin, 348.5 g hide glue (370–380 gram, Hudson Industries Corp.), 0.7 g sodium bisulfite and 10 g polysorbate 80 were added. The reaction mixture was heated to 71°–74° C. (160°–165° F.). Sucrose (198.1 g) was added, followed by 10.0 g polyethylenimine binder (50% actives, Polymin ™ P, BASF), 0.3 g methyl salicylate, 1.5 g of Foamaster ™ VF defoamer and 18.5 ml of water. The finished adhesive exhibited a pH of 8.0 and a viscosity of $6-7\times 10^5$ cps.

EXAMPLE IX

Animal Glue-Based Adhesive

A. A vertical kettle mixer equipped with steam-jacket heating is charged with 233 ml of water. Stirring is begun and 20 g titanium dioxide pigment, 3.0 g of Dowicide ™ G biocide, 296 g of glycerin, 1.0 g of sodium bisulfite, 12.0 g of an additional anti-foam agent and 434.6 g of bone glue (315 gram) are sequentially added. Stirring is continued for 10 minutes at 25° C. The temperature of the reaction mixture is then raised to 71°–74° C. (160°–165° F.) to yield the finished adhesive composition.

B. A vertical kettle mixer equipped with steam-jacket heating is charged with 233 ml of water which is maintained at 43° C. Titanium dioxide (16 g) is added to the water with stirring, followed by 318 g of 370–380 gram hide glue and 118 g of 160–170 gram hide glue. The stirred mixture is then heated at 71° C. and mixing is continued until the glue is dissolved. Glycerin (220 g—88%), 8.0 g Sutro ™ 970 sorbitol humectant, (ICI Americas, Wilmington, Del.) 10 g of Colloid ™ 796 defoamer, 5.0 g of Ucon ™ 50-HB-55 polyalkylene glycol, 3.0 g of octoxynol-9 surfactant, 0.3 g of methyl salicylate and 4.0 g of phenol are sequentially added, followed by an additional 10.0 g of water. The hot mixture is filtered and cooled to yield the finished adhesive composition.

EXAMPLE X

Lignin Sulfonate-PVA Covering Adhesive

Into a 600-millileter stainless steel beaker having an electrically-driven blade mixer immersed in a water bath at 99° C. was placed 100 of a 50 wt-% dispersion of an ammonium lignin sulfonate (Orzan ™ AL-50, III Rayonier Forest Products). The mixer was started and into the agitated liquid was sprinkled gradually, at a rate to permit smooth addition, 20 g of a partially-hydrolyzed low molecular weight polyvinyl alcohol (87.0–89.0 hydrolyzed—a 4% aqueous solution of the PVA having a viscosity of 4 to 6 cP, Vinol ™ 205, Air Products Chemicals, Inc.). The addition took about 1.0 hr, and after the addition was completed, the mixture was agitated until smooth, indicating the dissolution of all the polyvinyl alcohol. At the end of the dissolution, the temperature of the mixture was about 90° C. The product had 65% by weight total solids.

A series of products were prepared by diluting the product with 5 milliliter aliquots of water resulting in products having total solids content ranging from about 58 wt-% solids to 35 wt-% total solids, a total of 18 aliquot additions.

EXAMPLE XI

Lignin Sulfonate-PVA Covering Adhesive

Example X was repeated except that a mixture of 75 g of ammonium lignin sulfonate (AL-50) and 25 g of a 50 wt-% aqueous solution of a sodium lignin sulfonate (Orzan ™ SL-50, ITT Rayonier Forest Products) was substituted for the 100 g of AL-50.

EXAMPLE XII

Lignin Sulfonate-PVA Covering Adhesive

Example X was repeated except that 25 g of AL-50 and 75 g of SL-50 were used in place of 75 g of AL-50 and 25 g of SL-50.

The adhesives of Examples X–XIII were evaluated for quick tack, wet or green tack, speed of set, open time, and bond strength by drawing a film having a thickness of about 2.5–8 mils wet on an either ambient temperature or heated glass plate and applying to the coating a substrate. In all cases, the lignin sulfonate-polyvinyl alcohol composition of the invention was superior to animal glue adhesives in these characteristics.

The polyvinyl alcohol lignin sulfonate adhesives of the invention were evaluated for pot life by maintaining a stainless steel beaker containing 500 g of the adhesives at 88° C. for 4 days. Water loss by evaporation was repeatedly replaced and no appreciable loss in viscosity, quick tack, green tack, speed of set, open time, or bond strength was apparent, indicating the thermal stability of the adhesive.

EXAMPLE XIII

Book-Binding

Book blocks (9″ w×11″ 1×1″ h) composed of uncoated sheets of 20 lb. ground wood telephone stock were fed through a binding machine at 180 books per minute. The spines were sequentially roughed, trimmed and coated with the primer of Example V. The blocks were then passed along a clamp track and either were partially dried by exposure to a combination of heating lamps and blown hot air or were transmitted to the covering zone under ambient conditions. The wet spines were then coated with a layer of the animal glue-based covering adhesive of Example IXB at an application temperature of about 63°–65° C. (145°–150° F.). The blocks were then covered and trimmed with no loss of integrity.

After two months' storage under ambient conditions, the books prepared using the partially-dried primer required about 28–32 lbs. of force to put out individual sheets, which could also be flexed 660±220 times (1 kg pull) without separation from the spine. The books prepared employing the undried primer exhibited a page pull of 26.8±2.3 lbs. and a page flex of 812±238. A page pull of greater than 20 lbs. and a flex of greater than 100–200 times is considered to be normal, satisfactory performance for this type of book. The angle section peel evaluation indicated that no failure had occurred between the primer and the covering adhesive at a force at which the cover separated from the spine.

The above description, examples and discussion provides a basis for understanding the invention. However, since many variations and modifications of the invention can be made without departing from the spirit and scope of the invention, the invention resides wholly in the claims hereinafter appended.

What is claimed is:

1. A continuous book-binding process comprising:
   (a) roughing and cutting an assembly of a sufficient number of signatures resulting in a signature assembly having a high surface area location for the application of adhesives;
   (b) applying to the high surface area location an aqueous primer adhesive;
   (c) applying a hot coating of an adherent covering adhesive to the aqueous primer adhesive coating; and
   (d) contacting the adherent coating with a book cover, wherein the primer adhesive contains an adhesive latex and an amount of ungelatinized granular starch which complexes a major portion of the latex water and coalesces the primer adhesive to form a flexible film during step (c) without the application of external heat in a step between steps (b) and (c) which complexes essentially all of the primer water.

2. The process of claim 1 which does not include the application of external heat between steps (b) and (c).

3. The process of claim 1 wherein the covering adhesive is applied to the primer adhesive at a temperature of about 35°-100° C.

4. The process of claim 3 wherein the covering adhesive is an animal glue-based adhesive.

5. The process of claim 4 wherein the covering adhesive comprises about 25-50% animal glue, about 20-40% of a humectant-plasticizer and about 15-40% water.

6. The process of claim 3 wherein the covering adhesive comprises about 25-75% by weight of an aqueous phase and about 25-75% of a solid component dispersed therein, wherein said solid component consists essentially of a lignin sulfonate composition and a polyvinyl alcohol composition, wherein there are about 1-8 parts of the lignin sulfonate composition per each part of the polyvinyl alcohol composition.

7. The process of claim 1 wherein the starch comprises about 1-20% by weight of the primer composition.

8. The process of claim 7 wherein the starch comprises about 3-10% of a starch selected from the group consisting of barley, corn, potato, wheat, rice, waxy maize, sago, sorghum, arrowroot, tapioca and mixtures thereof.

9. The process of claim 8 wherein the adhesive latex comprises about 50-97% of the primer composition.

10. The process of claim 9 wherein the primer composition has a pH of about 7.0-7.5.

11. The process of claim 9 wherein the adhesive latex comprises particles of polymeric resin selected from the group consisting of polychloroprene, styrene-butadiene rubber, vinylidene chloride, ethylene-vinyl chloride copolymers, ethylene-vinyl acetate copolymers, vinyl acetate-acrylic acid copolymers and acrylonitrite-butadiene copolymers.

12. The process of claim 11 wherein the resin is an ethylene-vinyl acetate copolymer.

13. The process of claim 1 wherein the signatures comprise uncoated paper.

14. The process of claim 1 wherein the primer composition comprises about 0.05-2.5% of a biocide.

15. The process of claim 1 wherein the primer composition comprises about 0.05-2% of a foam control agent.

16. The process of claim 1 wherein the primer composition comprises about 1-10% of a plasticizer.

17. A book formed by the binding process of claim 1.

* * * * *